Jan. 5, 1960     H. B. McKEAN ET AL     2,919,732
DEVICE FOR CONSTRUCTING LAMINATED BOARDS
Filed July 16, 1956     12 Sheets-Sheet 2

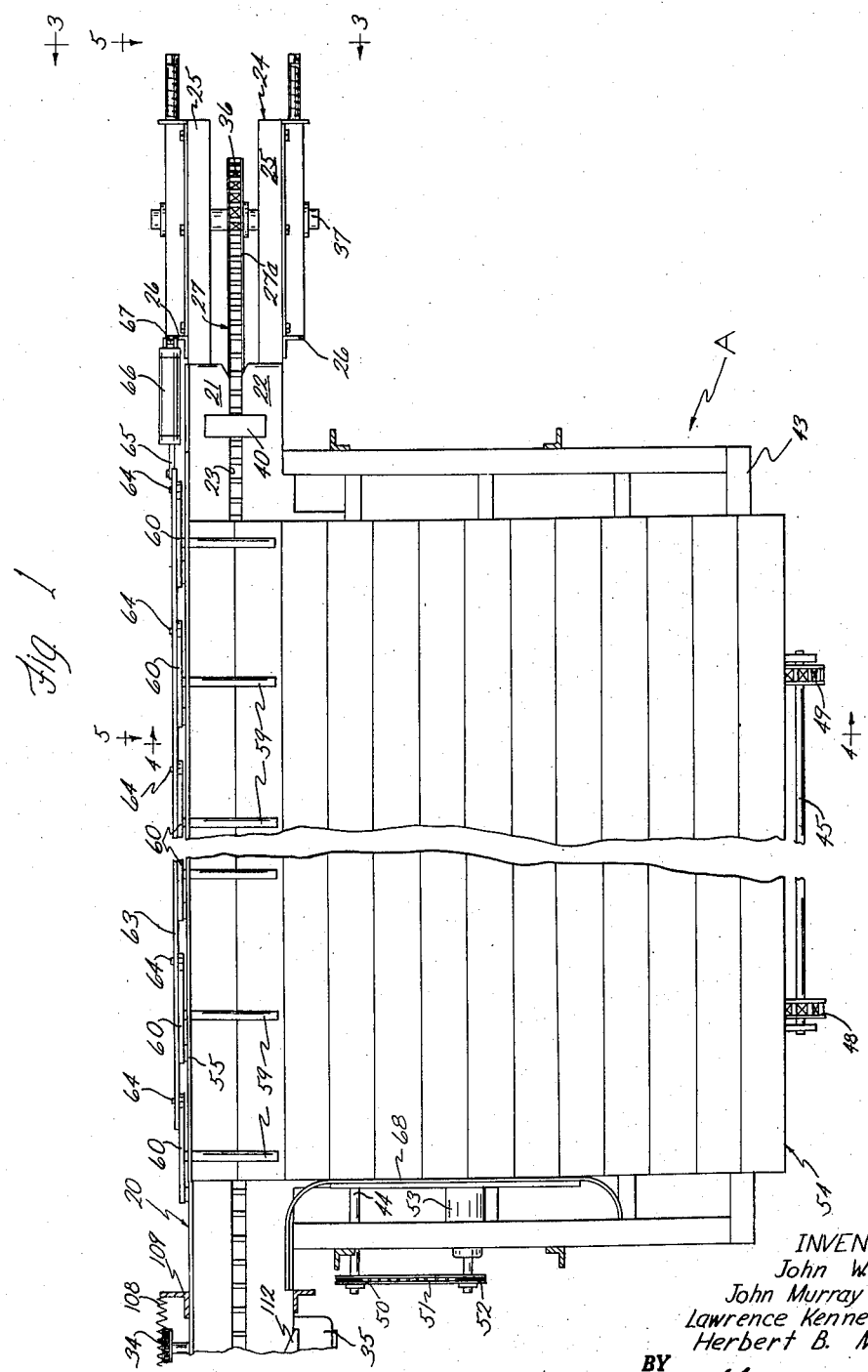

INVENTORS.
John W. Smith
John Murray Willows
Lawrence Kenneth Ross
Herbert B. McKean
BY
*Fred Wells*
Atty.

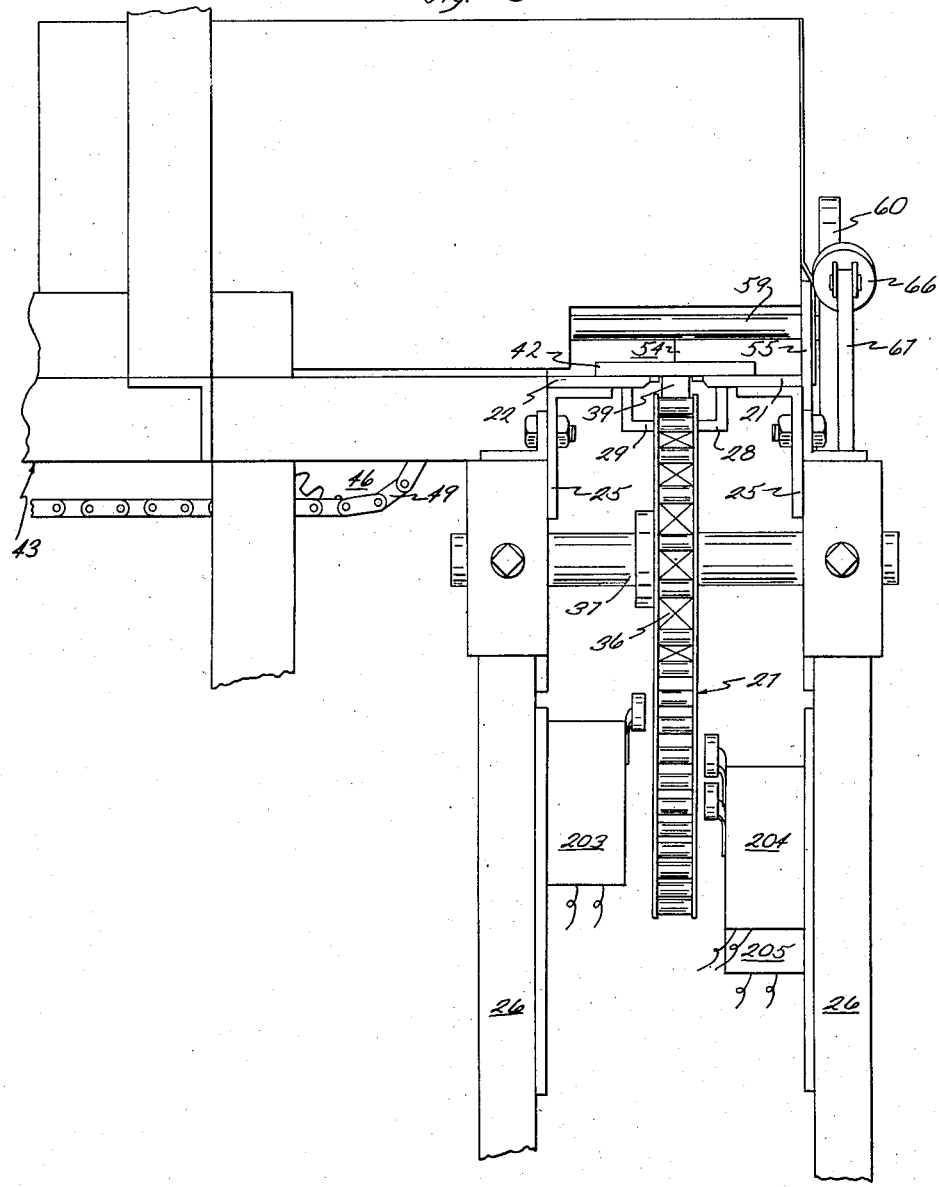

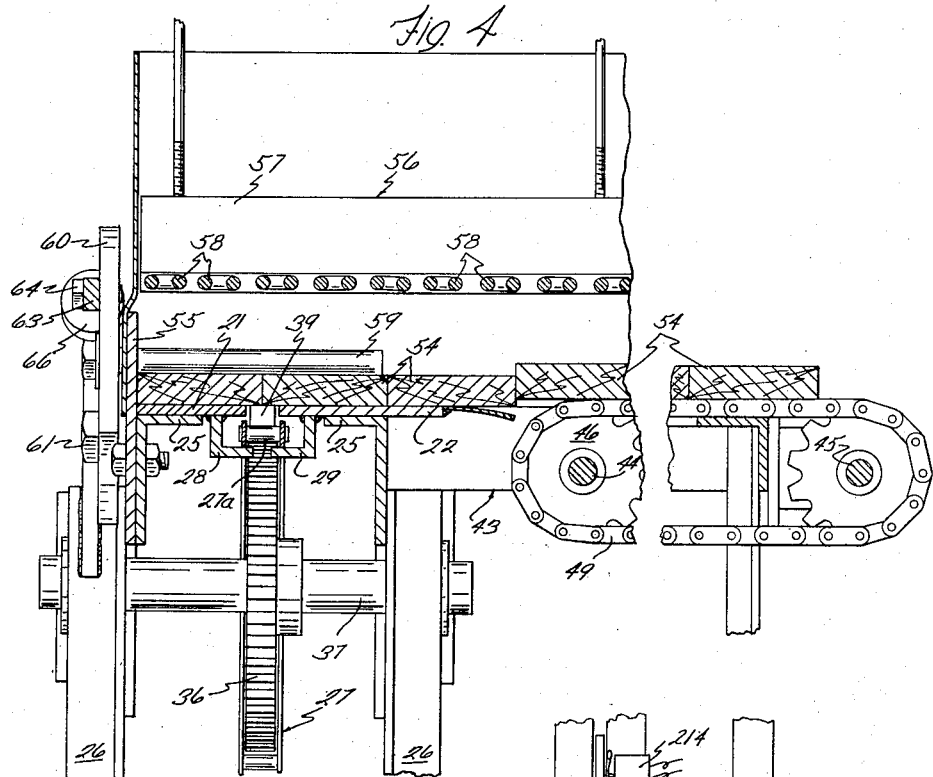

Jan. 5, 1960  H. B. McKEAN ET AL  2,919,732
DEVICE FOR CONSTRUCTING LAMINATED BOARDS
Filed July 16, 1956  12 Sheets-Sheet 5
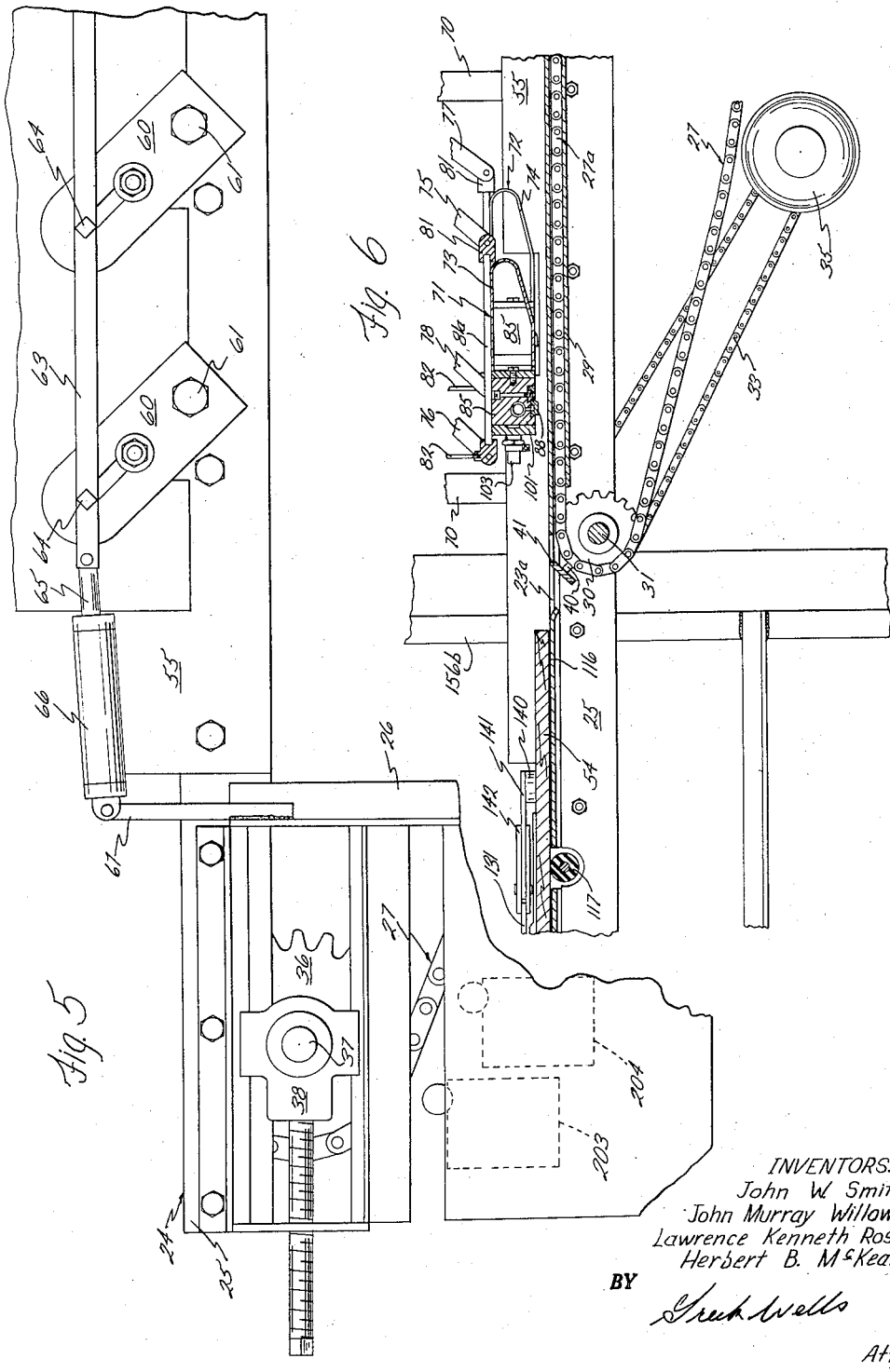
INVENTORS.
John W. Smith
John Murray Willows
Lawrence Kenneth Ross
Herbert B. McKean
BY
Fred Wells
Atty.

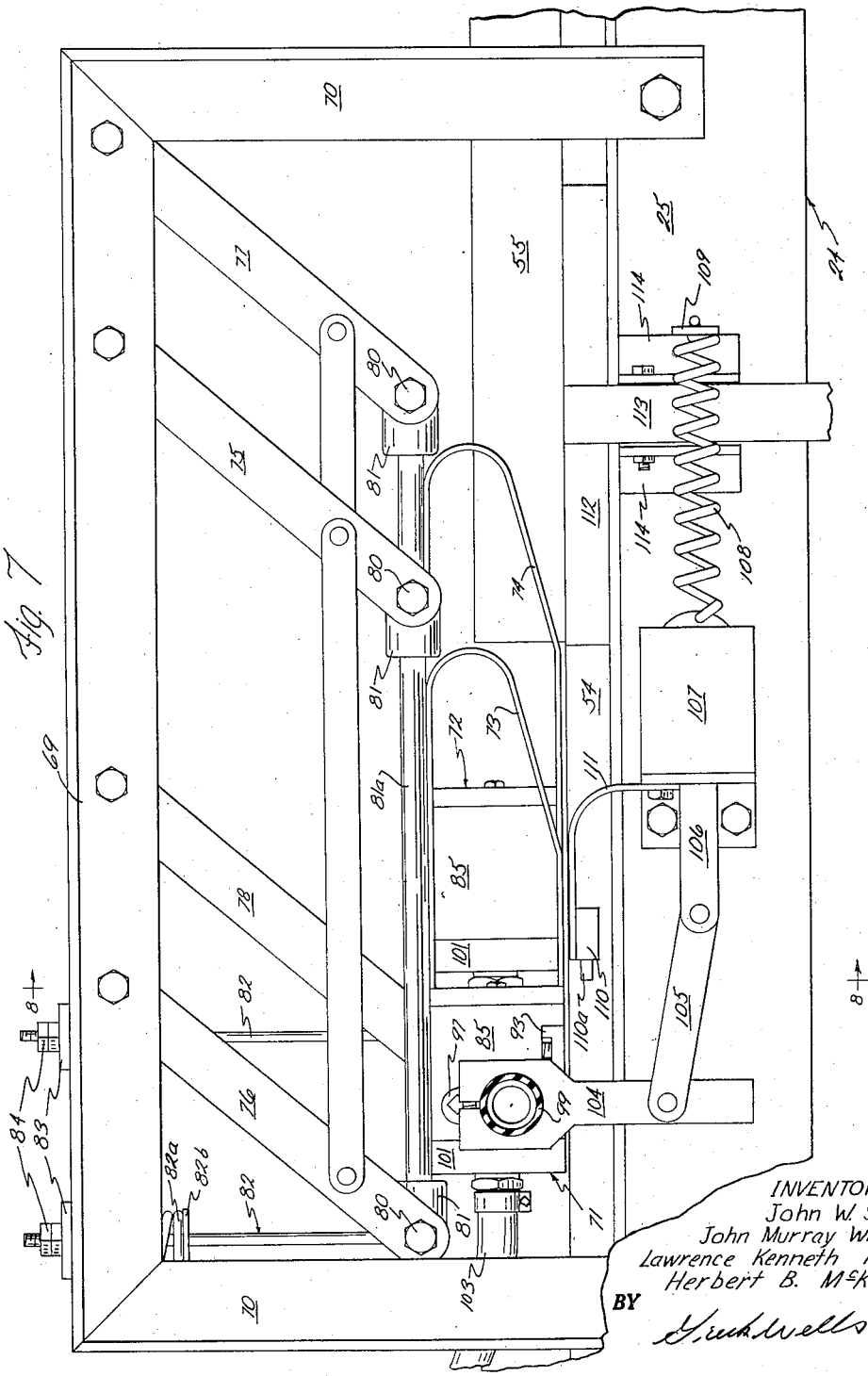

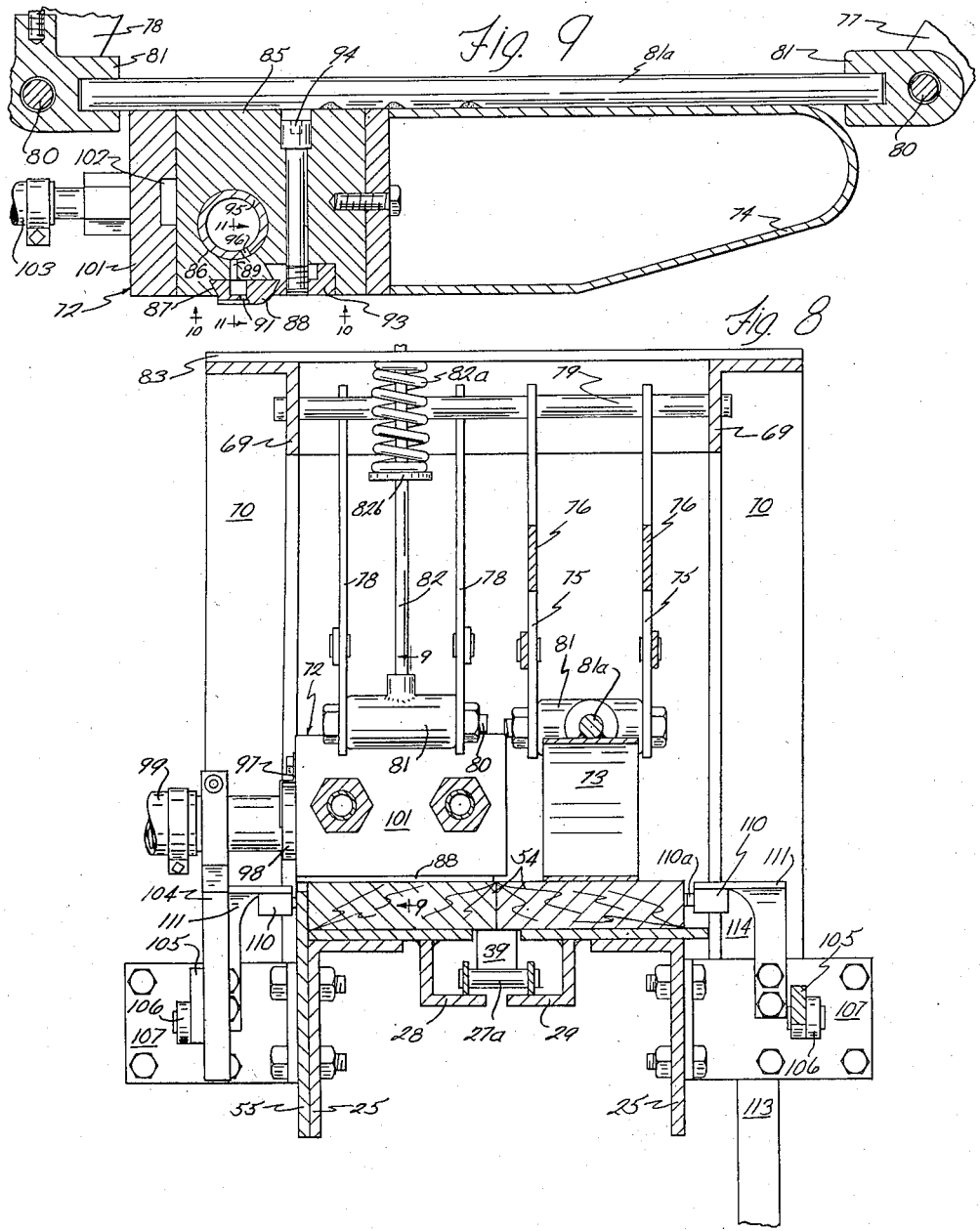

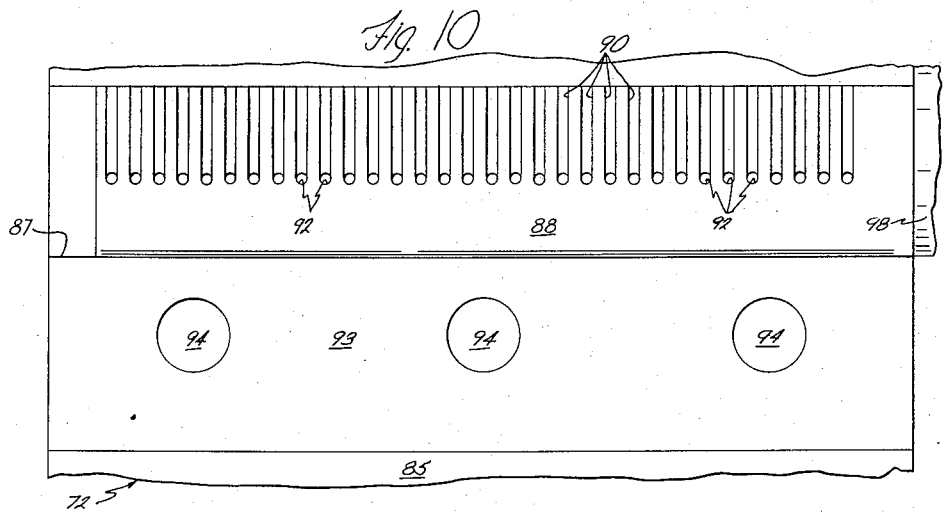
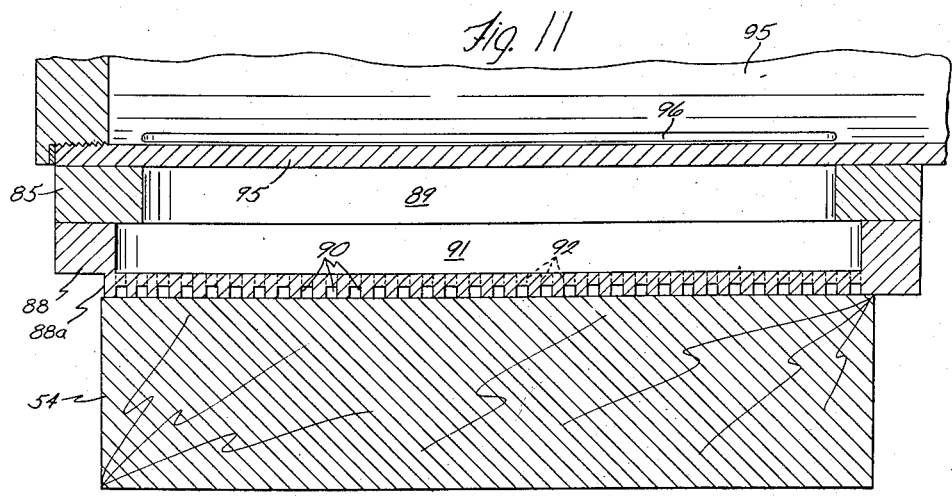

Jan. 5, 1960   H. B. McKEAN ET AL   2,919,732
DEVICE FOR CONSTRUCTING LAMINATED BOARDS
Filed July 16, 1956   12 Sheets-Sheet 8

INVENTORS.
John W. Smith
John Murray Willows
Lawrence Kenneth Ross
Herbert B. McKean
BY
*Green Wells*
Atty.

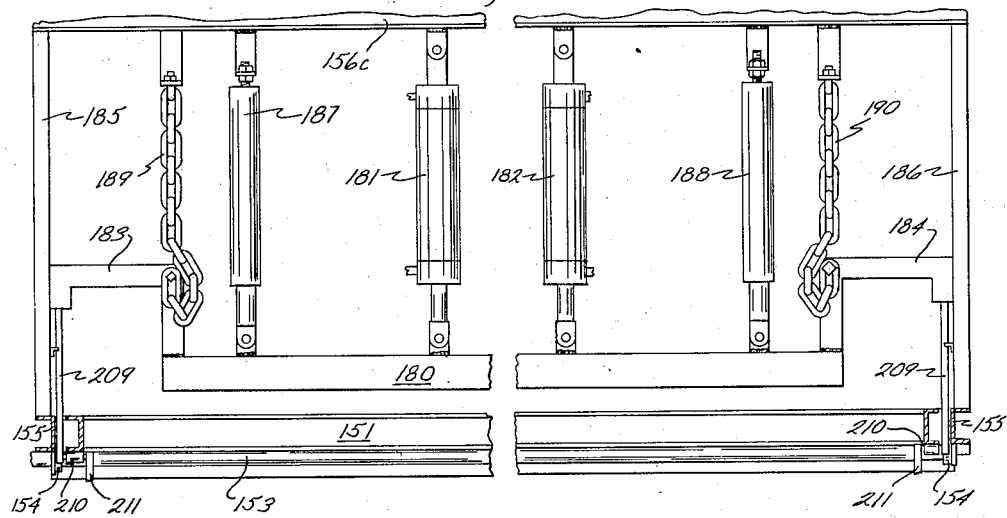
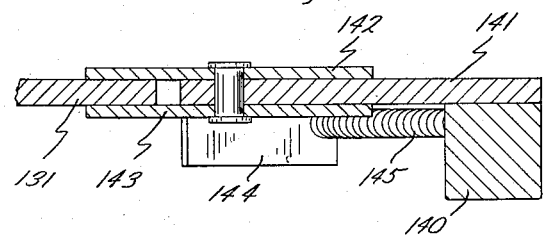

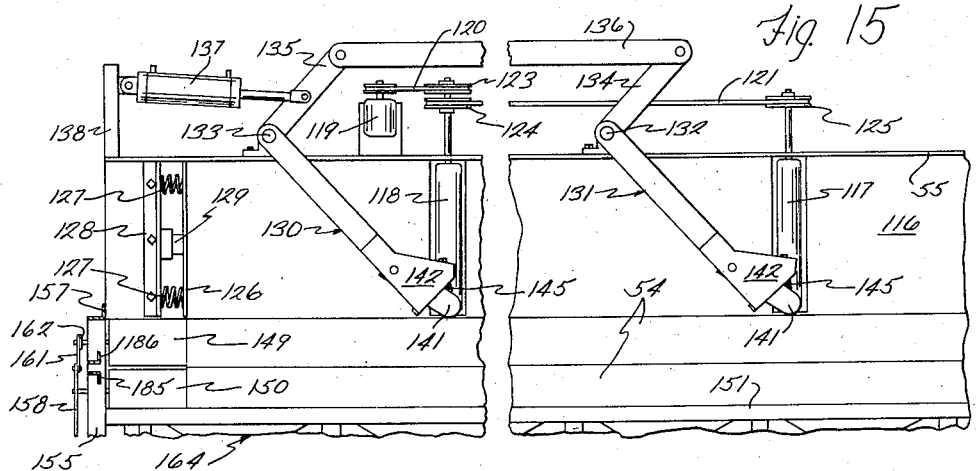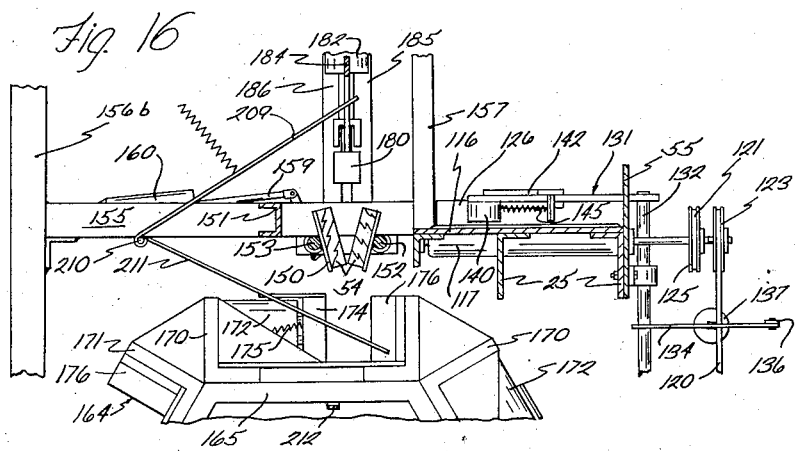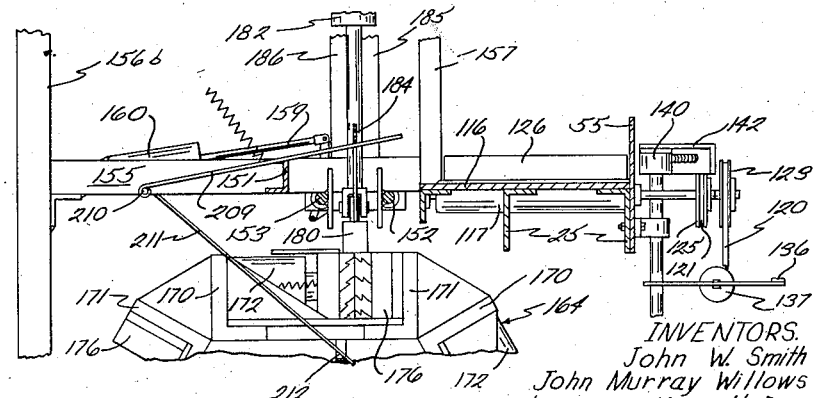

Jan. 5, 1960 H. B. McKEAN ET AL 2,919,732
DEVICE FOR CONSTRUCTING LAMINATED BOARDS
Filed July 16, 1956 12 Sheets-Sheet 12
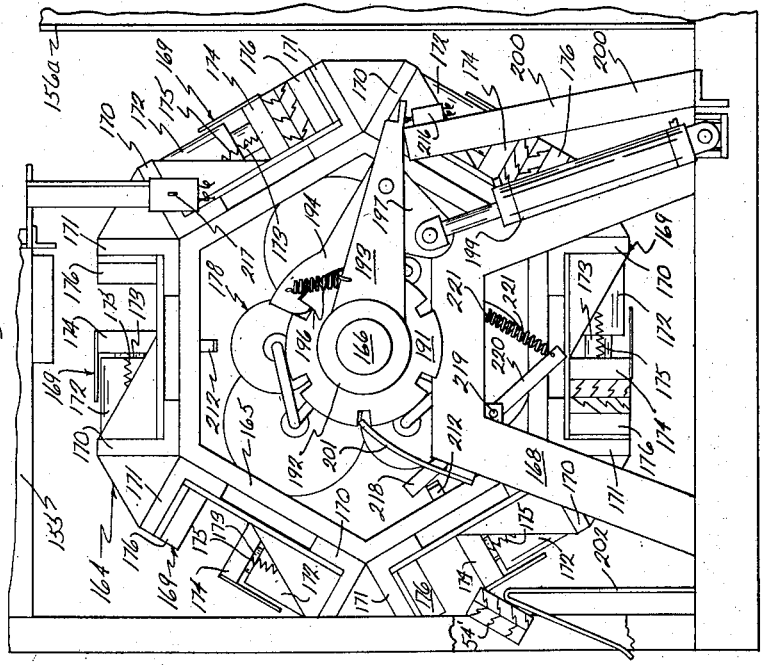
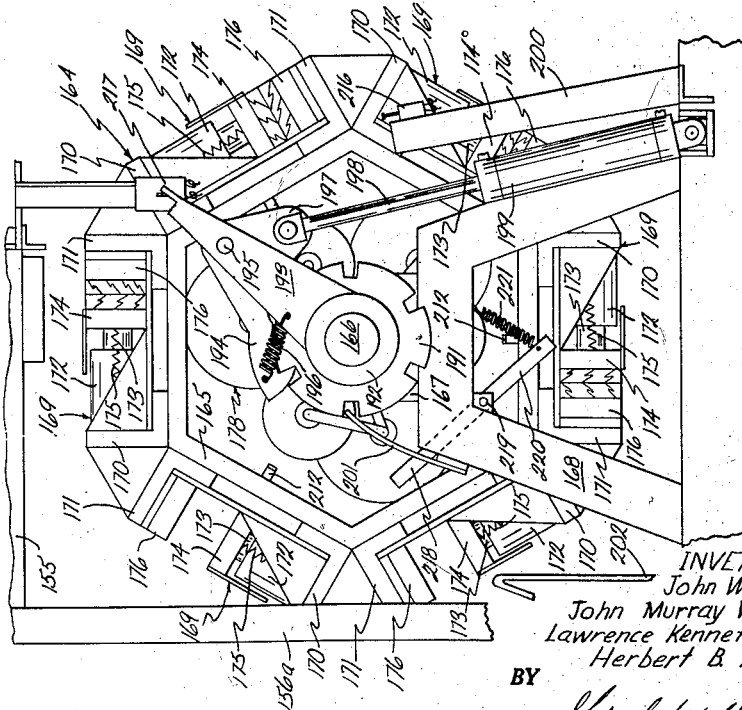
INVENTORS.
John W. Smith
John Murray Willows
Lawrence Kenneth Ross
Herbert B. M<sup>c</sup>Kean
BY
Atty.

United States Patent Office 2,919,732
Patented Jan. 5, 1960

2,919,732
DEVICE FOR CONSTRUCTING LAMINATED BOARDS

Herbert B. McKean and Lawrence Kenneth Ross, Lewiston, Idaho, John W. Smith, Clarkston, Wash., and John Murray Willows, Lewiston, Idaho, assignors to Potlatch Forests Inc., Lewiston, Idaho, a corporation of Maine Application July 16, 1956, Serial No. 598,097

11 Claims. (Cl. 144—279)

The present invention relates to improvements in a device for constructing laminated boards.

It has been recognized in the lumber industry during recent years that laminated lumber products have many characteristics not found in solid products. It has also been recognized that low grade wood could be marketed more effectively and at a greater profit if such wood could be used for laminated lumber. A laminated 2" x 4" board, for example, is of higher quality than two 1" x 4" boards used to make it, because of the random mismatching of knots and randomization of warp producing stresses in the laminated product.

With the recent advances in adhesives and methods of producing satisfactory glued joints, it has become possible to produce laminated lumber having bonds of sufficient strength and permanence. It has been found that if boards to be laminated are subjected to heat on the faces thereof to be joined, spread with an adhesive material of the proper kind and then pressed together within a very short time and held under pressure for a time to permit the glue joint to cure, a satisfactory glue joint will result. The only remaining problem has been to devise means to produce such joints at sufficiently low cost to compete with solid wood products.

It is the principal purpose of the present invention to provide a machine which will accept a plurality of boards, heat the surfaces thereof to be joined, apply adhesive to the heated surfaces of pairs of boards, and then rapidly join said surfaces of said pieces of boards together, maintaining the surfaces joined under pressure for a sufficient time to permit the glue joint to cure.

It is a further purpose of the invention to provide such a machine that will perform such operations on successive pairs of boards automatically and without manual control.

The above purposes are accomplished by providing a machine having three general sections. First an in-feed section is provided which comprises a feed table adapted to gather boards together in a side-by-side relation with the surfaces to be joined facing upward and pass them under a heating element. Second, a glue application section is provided which spreads glue on the upper heated surfaces of boards passed therethrough. Third, an assembly section is provided which receives the glued boards, turns them to butt the glued faces together, and presses them while the glue joint cures. These three sections are connected by a longitudinal conveyor which removes boards in pairs from the in-feed section, passes them through the gluing section, and delivers them to the assembly section. Each of the elements of the machine are operated intermittently and in timed sequence to operate upon successive pairs of boards in a continuous manner.

The particular machine illustrated and described hereinafter is adapted to produce laminated 2" x 4" boards from 1" x 4" boards. It should be understood, however, that the invention is not limited to the production of any single product such as 2" x 4" boards, but may be adapted for the manipulation of boards of various dimensions.

The nature and advantages of the invention will appear more clearly from the following description and the accompanying drawings wherein a representative form of the invention is shown. The description and drawings, however, are not intended to limit the invention except insofar as it is limited by the claims.

In the drawings:

Figures 1 and 2 taken together illustrate in plan view the machine embodying our invention;

Figure 3 is an enlarged fragmentary end view looking in the direction of the arrows 3—3 of Figure 1;

Figure 4 is an enlarged fragmentary vertical sectional view taken substantially on the line 4—4 of Figure 1;

Figure 5 is an enlarged fragmentary side view of the in-feed end of the machine, looking in the direction of the arrows 5—5 of Figure 1;

Figure 6 is an enlarged sectional view taken substantially on the line 6—6 of Figure 2;

Figure 7 is an enlarged elevation view of the glue spreading mechanism of the machine as viewed from the side where "B" appears in Figure 2;

Figure 8 is a vertical sectional view taken on the line 8—8 of Figure 7;

Figure 9 is an enlarged sectional view of one of the glue spreaders taken substantially on the line 9—9 of Figure 8;

Figure 10 is an enlarged fragmentary sectional view taken on the line 10—10 of Figure 9;

Figure 11 is an enlarged fragmentary sectional view taken on the line 11—11 of Figure 9;

Figure 13 is an enlarged fragmentary sectional view of one of the sweep arms taken substantially on the line 13—13 of Figure 2;

Figure 14 is an enlarged fragmentary sectional view taken on the line 14—14 of Figure 2;

Figure 15 is a fragmentary plan view of the assembly section of the machine, illustrating the operation of the sweep arms;

Figure 16 is an enlarged fragmentary sectional view taken substantially on the line 16—16 of Figure 2, illustrating the method by which the glued faces of the boards are joined;

Figure 17 is a view similar to Figure 16 but showing the boards loaded into a press unit;

Figure 18 is an enlarged vertical sectional view taken substantially on the line 18—18 of Figure 2;

Figure 19 is an enlarged fragmentary sectional view taken on the line 19—19 of Figure 2, showing the indexing mechanism for the press assembly; and Figure 20 is a view similar to Figure 19 but showing the indexing mechanism in operation.

Figure 12:
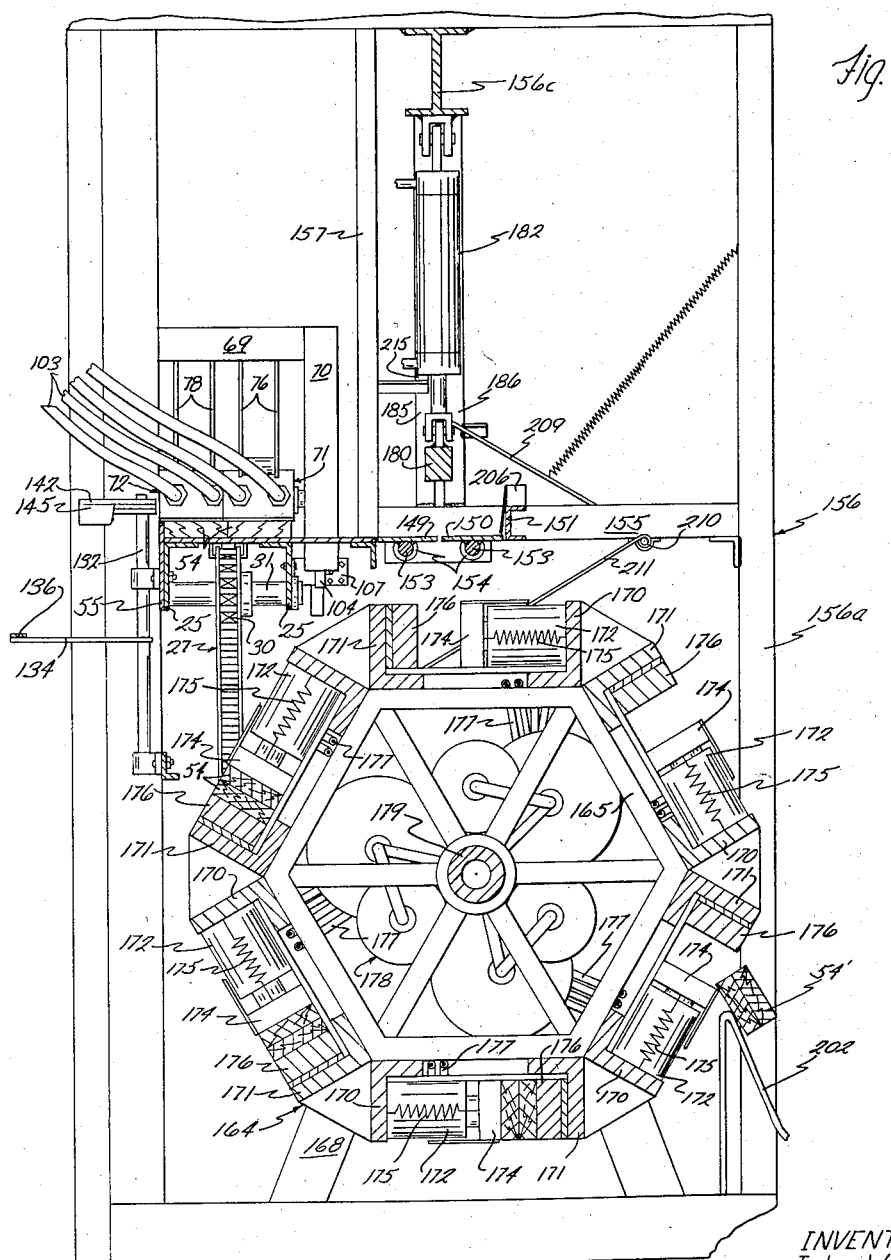
Figure 12 is an enlarged vertical sectional view taken on the line 12—12 of Figure 2.

Referring now to the drawings, and to Figures 1 and 2 in particular, the invention is shown as embodied in a laminating machine comprising three general sections; first an in-feed section A, second a glue application section B, and third, an assembly section C. These three sections are connected by a longitudinal conveyor generally indicated by the numeral 20.

Figures 1, 2, 3 and 4 best illustrate the longitudinal conveyor 20. The conveyor 20 is comprised of a pair of horizontal longitudinal plates 21 and 22, transversely spaced a short distance to provide a slot 23 therebetween. The plates 21 and 22 are supported on a table frame 24 which includes longitudinal frame members 25 and supporting legs 26. An endless conveyor chain 27 is provided on the frame 24 with its upper flight 27a positioned just below the slot 23 between the plates 21 and 22. The upper flight 27a may be supported in position by guide members 28 and 29 fixed to the underside of the plates 21 and 22, as shown in Figure 4. At the end of the conveyor frame 24 adjacent the assembly section C, a sprocket 30 is provide for the chain 27. The sprocket 30 is mounted on a shaft 31 journalled on the frame 24. The shaft 31 also carries a drive sprocket 32 at one end thereof. The sprocket 32 is connected by a chain 33 to a sprocket 34 on a drive motor 35 mounted beneath the frame 24. The motor 35 through the sprockets 32 and 34 and chain 33, drives the conveyor chain 27. The chain 27 is also trained around an idler sprocket 36 mounted on a shaft 37 at the end of the frame 24 adjacent the in-feed section A. The shaft 37 is journalled in longitudinally adjustable bearings 38, so that it may be moved to adjust the tightness of the chain 27.

The chain 27 has two outwardly extending lugs 39 and 40 spaced equidistantly thereon. The lugs 39 and 40 carry cross bars 41 and 42. The chain 27 is driven so that the top flight 27a travels toward the assembly section C. As the chain 27 moves, the cross bars 41 and 42 are carried over the plates 21 and 22 by the lugs 39 and 40, which move through the slot 23. When the cross bars 41 and 42 reach the end of the conveyor 20 adjacent the assembly section C, they pass downwardly through an enlarged portion 23a of the slot 23 which is located above the chain sprocket 30.

Boards to be glued together in pairs are fed onto the conveyor 20 at the in-feed section A, of the machine. The in-feed mechanism comprises a feed table 43 which extends transversely from the frame 24 of the conveyor 20. A pair of transversely spaced, longitudinal shafts 44 and 45 are journalled in the table 43. The shaft 44 has a pair of sprockets 46 fixed thereon and the shaft 45 has a pair of sprockets 47 fixed thereon. Feeder conveyor chains 48 and 49 are trained around each set of sprockets 46 and 47. The shaft 44 extends outwardly to one side of the table 43 as shown in Figure 1, and mounts a drive sprocket 50 at its end. The sprocket 50 is connected by a chain 51 to the sprocket 52 of a drive motor 53. The motor 53, through the sprockets 50 and 52 and the chain 51, drives the feeder conveyor chains 48 and 49. As shown in Figure 4, the feeder conveyor chains 48 and 49 extend into close juxtaposition with the plate 22 on the frame 24, and are positioned so that the upper flights of the chains 48 and 49 are substantially at the level of the plate 22. The chains 48 and 49 are driven so that their upper flights travel toward the plate 22. Boards 54 to be glued together to form laminated lumber are placed on the feed table 43 as shown in Figure 1. The board 54 represented in the drawings are 1"x4" pieces, which are to be glued in pairs to form 2"x4" members. The boards 54 are placed on the table 43 with the surface to be glued facing upward. The boards 54 are moved transversely onto the plates 21 and 22 by the chains 48 and 49. The plates 21 and 22 are sufficiently wide to receive two boards 54 thereon in a side by side relation, the slot 23 being beneath the adjacent edges of the boards. A vertical stop and guide plate 55 is provided at the outer edge of the plate 21 to properly position the boards 54 as they are moved onto the plates 21 and 22.

A heating element 56, shown in Figure 4, is positioned above the plates 21 and 22 adjacent the feed table 43. The heating unit is wide enough to cover the two boards on the plates 21 and 22 and at least two additional boards as well. The heating unit is suspended by rods 58 from a framework 57 extending above the frame 24, in such a manner that its height above the boards 54 can be readily adjusted. As the boards 54 are moved onto the plates 21 and 22, the heating unit 56 heats the upper surfaces thereof, storing heat in these surfaces for use in curing the adhesive used to bond each pair of boards 54 together.

When sufficient heat is stored in the two boards 54 on the plates 21 and 22, one of the cross bars 41 or 42 engages the ends of these two boards 54 and pushes them endwise toward the glue application section B. It is possible that the boards 54 which are fed onto the plates 21 and 22 may be warped so that they do not lie flat. If the warpage is such that the ends of the boards are raised from the plates 21 and 22, the cross bar 41 or 42 may not engage the boards but instead pass beneath one or both of them. To prevent this, a plurality of hold down fingers 59 are provided. These fingers 59, shown best in Figures 1, 4 and 5, extend transversely above the plates 21 and 22 at spaced intervals above the area on the plates 21 and 22 wherein the boards 54 are fed from the conveyors 48 and 49. The fingers 59 are secured to vertical links 60, pivoted at 61 to one of the longitudinal frame members 25. As shown in Figure 5, the fingers 59 are secured in slots 62 in the links 60 so that they may be adjusted up or down to accommodate different sizes of material thereunder. The links 60 are each pivoted near their upper ends to a bar 63 by pivot pins 64. The bar 63 is attached to the piston 65 of a compressed air cylinder 66. The cylinder 66 is pivotally mounted to a bracket 67 secured to the frame 24 as shown in Figures 3 and 5. When a pair of boards 54 are placed on the plates 21 and 22, the cylinder 66 is operated to draw in the piston 65, thereby pivoting each of the links 60 toward horizontal and causing the fingers 59 to engage and press lightly upon the boards 54 to flatten them so that cross bar 41 or 42 may engage their ends and push them toward the glue application section B.

In order to insure that the friction between the pair of boards on the plates 21 and 22 and those boards adjacent thereto does not cause the boards remaining on the conveyor chains 48 and 49 to move endwise, a stop plate 68 is provided, as shown in Figure 1, on the table 43 to prevent endwise movement of the boards thereon.

The cross bars 41 and 42, moved by the chain 27, push the pair of boards 54 along the plates 21 and 22 through the glue application section B to the assembly section C. The stop and guide plate 55 at the edge of the plate 21 keeps the boards 54 properly aligned. The glue spreading mechanism is suspended above the conveyor 20 between the in-feed section A and the assembly section C, by an over head framework 69 supported on vertical members 70 which extend up from the frame 24. The glue spreading mechanism comprises two glue spreaders generally indicated at 71 and 72 which have thereon forwardly extending curved guide boots 73 and 74 as best shown in Figures 7 and 9. The spreaders 71 and 72 are suspended from the framework 69 by pivoted links 75, 76, 77 and 78, each of which is pivoted at its upper end to a cross rod 79 secured in the framework 69. The lower ends of the links 75—78 are pivoted to bolts 80 carried by bearing units 81 which are pivotally secured to the ends of rods 81a fixed to the tops of the spreaders 71 and 72, as shown in Figures 7, 8 and 9. As may be seen, the frame 69, the links 75 and 76 and the spreader 71 form a parallelogram, so that the spreader 71, while free to move rearwardly and upwardly, must remain horizontal. The frame 69, the links 77 and 78, and the spreader 72 form a second parallelogram which maintains that spreader in horizontal position. Since each spreader 71 or 72 is pivotally suspended between the bearings 81, it free to tilt in a transverse direction to follow transverse warpage in the boards 54.

The function of the spreaders 71 and 72 is to spread a coat of adhesive material over the entire upper surface of each board 54. In order to insure that adhesive is applied for the entire width of each board, it is necessary that each spreader 71 or 72 be slightly wider than the board 54. Since the boards are passed under the spreaders with adjacent edges touching and since the spreaders are wider than the boards, it is necessary to stagger the spreaders 71 and 72 (see Fig. 2).

The downward movement of the spreaders 71 and 72 is limited by rods 82 which extend down from cross bars 83 on the frame 69 and thread into the top of the rear bearing unit 81 of each spreader 71 or 72. The rods 82 extend through apertures in the cross bars 83 and carry nuts 84 above the cross bars 83. Springs 82a interposed between the cross bars 83 and collars 82b on the rods 82 force the spreaders down to maintain contact with the boards 54. The nuts 84 engage the cross bars 83 to hold the spreaders 71 and 72 a predetermined distance above the plates 21 and 22. This distance is somewhat less than the thickness of the boards 54 so that as they advance under the frame 69 they engage the boots 73 and 74 and raise the spreaders 71 and 72 so that the spreaders 71 and 72 are free to ride on the upper, heated surfaces of the boards 54.

Each of the spreaders 71 or 72 comprises a solid body portion 85 which has therein a transverse bore 86. The bottom of the body portion 85 is notched at 87 to receive a spreader shoe 88. A vertical slot 89 extends from the bore 86 to the notch 87. The shoe 88, best shown in Figures 9, 10 and 11, has a number of spaced apart grooves 90 in its lower surface which extend from the center of the shoe 88 to the rear edge thereof. A transverse slot 91 is formed in the upper surface of the shoe 88 above the forward ends of the grooves 90. A series of small apertures 92 extend from the slot 91 to the grooves 90. When the shoe 88 is seated in the notch 87, the slot 91 in the shoe 88 is aligned with the slot 89 in the body 85 of the spreader 71 or 72. With this construction, adhesive material introduced into the slot 89 will flow down into the slot 91 in the shoe 88, and from the slot 91 through the apertures 92 to the grooves 90. The board 54 sliding under the shoe 88 will receive the adhesive from the grooves 90.

As shown in Figure 11, the grooves 90 overlie the entire upper surface of the board 54. The shoe 88, however, overlaps the edges of the board somewhat. At the end of the shoe 88 overlying the edge of the board 54 which is adjacent the other board 54, a notch 88a is provided in the shoe 88. With this construction, a slight increase in the height of the upper surface of the adjacent board 54, caused by inaccurate finishing or warpage, will not cause the shoe 88 to be raised from the surface of the board 54 thereunder.

In order to removably secure the shoe 88 in the notch 87 without leaving any downwardly projecting connecting members, the rear edge of the notch 87 is undercut somewhat to support the shoe 88 against dropping therefrom. A shoe holding plate 93 is seated in the notch 87 in front of the shoe 88 to support it. The plate 93 is secured in the notch 87 by bolts 94 which extend through the body 85 from above and thread into the plate 93.

Adhesive is supplied to the spreader 71 or 72 through a valve sleeve 95 which is rotatably mounted in the bore 86. The sleeve 95 has a slot 96 therein which may be aligned with the slot 89 by rotation of the sleeve 95, to permit flow of adhesive material from the sleeve 95 to the shoe 88. When the sleeve 95 is rotated to move its slot 96 out of alignment with the slot 89 the flow of adhesive is stopped. The sleeve 95 is held in the bore 86 by a retaining fork 97 which is secured to the body 85 of the spreader 71 or 72 and which engages a collar 98 fixed on the sleeve 95, permitting the sleeve 95 to be rotated, but preventing endwise movement thereof. A glue hose 99 is attached to the outer end of the sleeve 95 and conducts adhesive to the sleeve 95 from a glue pot (not shown) mounted above the gluing mechanism. The glue pot is pressurized to force the adhesive to flow when the valve sleeve 95 is rotated to align the slots 96 and 89. The pot also has an annular water jacket to permit the adhesive therein to be maintained at a constant temperature.

The spreaders 71 and 72 are also provided with temperature controlling means, comprising plates 101 bolted to the rear faces of the body portions 85. The plates 101 have apertures 102 therein through which water is circulated by circulating hoses 103 connected to the plates 101 whereby to maintain the spreaders 71 and 72 at a constant desired temperature.

The spreaders 71 and 72 must be capable of spreading adhesive on the boards 54 for their full length, but should not remain operative after the boards 54 have passed thereunder. In order to operate the valve sleeves 95 so that they are rotated to allow glue flow only when boards 54 are passing beneath, each sleeve 95 is provided with a lever arm 104 which is fixed thereto. The lever arm 104 is pivoted to a link 105 which, in turn, is pivoted to the movable core 106 of a solenoid 107. The solenoids 107 are carried on the frame members 25 of the frame 24. The cores 106 are spring tensioned by spring 108 attached to brackets 109 on the frame 24 to hold the levers 104 in position to maintain the valve sleeves 95 in closed position. When the solenoids 107 are energized, however, the cores 106 are moved against the springs 108 to pivot the levers 104 toward vertical and move the sleeves 95 to open position. The solenoids 107 are energized by closing micro switches 110 which are carried by brackets 111 mounted to the solenoids 107 and which are so positioned that their actuating arms 110a are engaged by the side edges of the boards 54 as these boards are moved beneath the glue spreaders 71 and 72. As shown in Figure 7, each micro switch 110 is positioned adjacent the forward edge of the spreader 71 or 72 it controls, so that a board closing the switch 110 just reaches the shoe 88 as the adhesive flows from it. The switches are opened when the rear end of each board 54 passes, so that the flow of adhesive is stopped as the end of the board 54 passes beneath the shoe 88.

Since the boards 54 must be passed beneath the spreaders 71 and 72 in proper alignment and with adjacent edges touching, a crowder bar 112 is provided just ahead of the spreaders 71 and 72. The crowder bar 112, best shown in Figures 2, 7 and 8, is positioned above the edge of the plate 22 to engage the outer edge of the board 54 passing thereover. The bar 112 is carried by a vertical arm 113 pivoted to brackets 114 on one of the frame members 25. A spring 115 connected to the lower end of the arm 113, pivots the arm 113 to move the bar 112 against the boards 54 thereby crowding them against the guide member 55 and bringing them into proper position to receive their adhesive coatings.

As the adhesive coated boards 54 are passed from the glue application section B, they are discharged from the conveyor 20 onto a platform 116 in the assembly section C. The platform 116 is supported by the frame 24 which continues beyond the end of the conveyor 20. A pair of transverse rubber rollers 117 and 118 are set into the platform 116 to assist in positioning the boards 54 thereon. The rollers 117 and 118 are driven continuously by a motor 119 through belts 120 and 121 and pulleys 122, 123, 124 and 125, as shown in Figure 2. The rollers 117 and 118 engage the boards 54 as they are discharged onto the platform and move them against an end stop 126. The stop 126 is mounted adjacent the end of the platform 116 by springs 127 supported on a bracket 128. A shock absorber 129 is also connected between the bracket 128 and stop 126. With this construction the boards 54 are brought to a cushioned stop by the end stop 126 and firmly held there against by the rollers 117 and 118.

A pair of sweep arms 130 and 131, mounted on vertical shafts 132 and 133, are positioned at the edge of the platform 116 adjacent the guide member 55, which extends the full length of the platform 116. The shafts 132 and 133 are journalled on the frame 24 and have outwardly extending levers 134 and 135 fixed thereon. The levers 134 and 135 are connected by a link 136 so that they will move equally and in unison. The sweep arms 130 and 131 are actuated by an air cylinder 137 fixed to a bracket 138 on the frame 24 and having its piston 139 pivoted to the lever 135 on the shaft 133. When air under pressure is supplied to the cylinder 137, the piston 139 will move outward, causing the levers 134 and 135 to rotate the shafts 132 and 133.

Each of the sweep arms 130 and 131 carries at its free end a depending finger 140 pivoted to a spring tensioned lever 141. The lever 141 is pivoted between a pair of vertically spaced plates 142 and 143 (see Figure 13) which are secured to the sweep arm 130 or 131. The upper plate 142 extends outwardly to the rear side of the sweep arm 130 or 131 and has at its rear edge a depending flange 144. A spring 145 is positioned between the flange 144 and the finger 140 to urge the finger 140 and lever 141 forwardly. A depending stop bar 146 fixed between the plates 142 and 143 at their front edge limits the forward movement of the lever 141.

The sweep arms 130 and 131 are mounted above the guide member 55 with the fingers 140 positioned outside of the guide member 55. Notches 147 and 148 in the guide member 55 permit the fingers 140 to pass therethrough to engage the boards 54. The sweep arms 130 and 131 move the pair of adhesive coated boards 54 transversely off the platform 116 and onto a pair of flipper plates 149 and 150 positioned adjacent to and level with the platform 116, as shown in Figure 15. Each of the flipper plates 149 and 150 is equal in width to the width of one board 54 so that each supports one board 54 thereon. A longitudinal channel iron 151 positioned at the edge of the flipper plate 150 stops the boards 54 directly over the flipper plates 149 and 150. The particular construction of the sweep arms 130 and 131 including the spring tensioned levers 141 permit the sweep arms 130 and 131 to move a short distance beyond the position where the boards 54 are stopped by the channel iron 151, as shown in Figure 15 to insure that the boards 54 are properly aligned over the flipper plates 149 and 150.

The flipper plates 149 and 150 are fixed to longitudinal shafts 152 and 153 which extend thereunder. The shafts 152 and 153 are journalled in bearings 154 carried by frame members 155 which extend transversely of the machine at the ends of the platform 116. The frame members 155 form part of a large frame 156 which, together with the frame 24, supports the mechanism of the assembly section C. The frame 156 comprises vertical, transversely extending rectangular frames 156a and 156b positioned at the opposite ends of the assembly section C and joined by a longitudinal beam 156c which is positioned directly above the flipper plates 149 and 150. Each of the members 155, which support the flipper plate bearings 154 and the channel 151, is connected at one end to the side of the adjacent rectangular frame 156a or 156b, and is connected at the opposite end to a vertical member 157 which depends from the top of the adjacent rectangular frame 156a or 156b.

At the ends of the shafts 152 and 153 adjacent the frame 156b flipper plate operating means, best shown in Figure 14, are positioned. These means comprise a lever 158 fixed to the shaft 153 at its center and pivoted to the piston 159 of an air cylinder 160 at the end 158a thereof. The opposite end 158b of the lever 158 is pivoted to a link 161 which, in turn, is pivoted to a lever 162 secured to the shaft 152. The air cylinder 160 is pivotally supported from a bracket 163 carried on one of the frame members 155. When air under pressure is supplied to the cylinder 160, its piston 159 is extended, causing the lever 158 to pivot in a clockwise direction as shown in Figure 14, thus rotating the shaft 153 in the same direction to tip the flipper plate 150 to a vertical position with the edge thereof normally adjacent the plate 149 down. Pivoting the lever 158 in a clockwise direction causes the portion 158b to pivot down, drawing the link 161 down and causing the shaft 152 to rotate counterclockwise. This tilts the flipper plate 149 to a vertical position with the edge thereof normally adjacent the plate 150 down.

When the plates 149 and 150 are so tilted, the adhesive coated boards 54 are positioned thereon. As illustrated in Figures 16 and 17, the tilting action of the plates 149 and 150 turns the boards 54 so that their coated surfaces are adjacent to each other and passes them down between the two tilted plates 149 and 150.

Below the flipper plates 149 and 150, a cylindrical press assembly, generally indicated by the numeral 164, is positioned. This assembly comprises a hexagonal framework 165 mounted on a longitudinal shaft 166. The shaft 166 is journalled in bearings 167 supported by frame pieces 168 which are mounted in the vertical rectangular end frames 156a and 156b. On each of the six surfaces of the hexagonal framework 165 an axially extending press unit 169 is provided. Each unit 169 is comprised of two heavy angle irons 170 and 171 which rest on the frame 165, facing each other. Each angle iron 170 mounts four spaced oil cylinders 172 which extend toward the angle iron 171. The cylinders 172 have pistons 173 which mount individual jaws 174. Each jaw is free to move toward the angle iron 171 when oil is supplied to its cylinder 172, but is urged toward open position by springs 175 connected between the jaw 174 and the angle iron 170. The angle irons 171 support fixed jaws 176 which are normally spaced from the jaws 175 a distance slightly greater than twice the thickness of one of the boards 54.

The four cylinders 172 of each press unit 169 are connected by hoses 177 to an air-to-oil pressure intensifying device, generally indicated by the numeral 178, mounted within the framework 165. There are six of these devices 178, one for each press unit 169. The devices are mounted three at each end of the frame 165. The devices 178 receive air under pressure through a conduit 179 extending through the center of the shaft 166, from a compressor (not shown). The devices 118 intensify the air pressure and transmit it to the oil of the cylinders 172. The devices 178 are not described in detail herein since they are old and well known. Any suitable device that will receive air under compression from a compressor, and intensify and transmit the pressure to the cylinders 172 is sufficient for the device 178.

The press assembly 164 is so positioned under the flipper plates 149 and 150 that the opening between the jaws 145 and the jaw 146 of the upper press unit 169 is aligned below the flipper plates. When the boards 54 are dropped, coated faces together, through the space between the tilted flipper plates 149 and 150, they drop into the top press unit 169. When the boards 54 drop into the press 169 they are aligned endwise, but due to warpage in the individual boards, they may not be properly aligned in a direction transverse to their faces. Warpage may exist so that the bottom side edge of one board is concave and only the ends of that bottom side edge rests on the bottom of the press unit, while the other board may be warped in the opposite direction. To product straight laminated boards, it is necessary that the two boards 54 be joined with their side edges in alignment. In order to straighten the boards 54 in the press 169 so that all portions of the bottom side edges thereof rest flat upon the bottom of the press, a horizontal pressure bar 180 is provided. The bar 180 is suspended above the flipper plates 149 and 150 from the longitudinal frame member 156c by a pair of vertical air cylinders 181 and 182, as shown in Figures 12 and 18. The pressure bar has upwardly and outwardly extending guide arms 183 and 184 thereon at each end, which are received between paired guide bars 185 and 186 mounted at each end of the bar 180 in the vertical rectangular end frames 156a and 156b. After the flipper plates have been tilted to bring the boards 54 together and drop them into the press 169, the pressure bar 180 is lowered by supplying air to the cylinders 181 and 182. The bar 180 follows the boards 54 down between the tilted flipper plates 149 and 150 and engages the upper side edges of the boards 54 as they come to rest between the jaws 175 and 176 of the press unit 169. The bar 180 presses down on the boards until they lie straight. The bar 180 remains in this position until the cylinders 172 are actuated to close the jaws 175 against the jaw 176. After the jaws have been closed and the boards 54 are clamped together, the bar 180 is allowed to move upward to its normal position above the plates 149 and 150. As best shown in Figure 18, the bar 180 is provided with shock absorbers 187 and 188 to cushion the impact of the bar 180. Movement limiting chains 189 and 190 are also provided to prevent the pressure bar 180 from moving too far into the press unit 169.

After the boards 54 have been joined under pressure, it is necessary to maintain the pressure for a time to allow the adhesive joint to cure. To allow sufficient curing time for each set of boards 54 without slowing the production, the press assembly 164 is rotated after the upper unit 169 is filled, to move that filled unit away from beneath the flipper plates 149 and 150, and to move a new, empty press unit 169 into operating position. The means for accomplishing this rotation or indexing of the press assembly are best illustrated in Figures 19 and 20.

At the end of the press assembly 164 nearest the infeed section A of the machine, a notched ratchet gear 191 is fixed on the shaft 166. Adjacent the gear 191, a rotatable sleeve 192 is mounted on the shaft 166. The sleeve 192 carries an arm 193. A pawl 194 is pivoted to the arm by a pin 195 near the outer end thereof. The pawl 194 is adapted to engage with one of the notches in the ratchet gear 191. A spring 196 connected between the pawl 194 and arm 193 urges the pawl 194 into engagement with the notches of the gear 191. The pawl 194 has an offset arm portion 197 thereon which extends outwardly at right angles to the pawl from the pin 195. The piston 198 of an air cylinder 199 is pivoted to the offset portion 197, as shown in Figures 19 and 20. When the press assembly 164 is to be rotated 60 degrees to bring an empty press unit 169 into position to receive a pair of boards 54, air is supplied to the cylinder 199 so as to cause the piston 198 to be drawn in. This pivots the arm 193 and pawl 194 down, as shown in Figure 20. Since the pawl 194 is engaged with the gear 191, it too is rotated, and causes the press assembly 164 to turn also. When a rotation of 60 degrees has taken place, the arm 193 strikes a stop 200. The air to the cylinder 199 is reversed, and the piston 198 moves upwardly. As may be seen in Figure 20, the relation of the piston 198 to the pivot pin 195 of the pawl 194 is such that when the piston moves upwardly, it causes the pawl 194 to be pivoted out of engagement with the gear 191. Further upward movement of the piston 198 pivots the arm 193 and pawl 194 back to their original positions. The spring 196 then causes the pawl 194 to engage another notch of the gear 191 to set the mechanism for the next indexing operation. A spring arm 201 mounted on the frame piece 168 bears against the ratchet gear 191 and prevents reverse rotation thereof when the press assembly 164 is properly indexed.

When the pair of boards 54 has been received by one of the press units 169, the operation on that pair has been completed, and it is held in the press unit during at least three indexing operations to allow the glue joint to cure. When the press unit 169 carrying the now completed laminated board 54' has reached a position on the underside of the assembly 164, the press unit 169 is opened and the board 54' is allowed to drop out, as shown in Figures 19 and 20. A slide 202 may be provided at this point to carry the completed board 54' to a loading point.

The sequence of operation of the machine, including the means for controlling the operation thereof, will now be described. The operation is controlled by switches located at various points in the machine. While these switches and their functions will be described, the particular electrical circuits through which the switches operate will not. It is believed that the provision of suitable control circuits is well within the purview of a skilled electrician.

When the machine is to be set in motion to produce laminated boards 54', the first step is to place a supply of boards 54 on the feed table 43. The conveyor chains 48 and 49 should be manually actuated to move a pair of boards onto the plates 21 and 22 under the heating unit 56. After this is accomplished the entire machine, except for the continuously rotating rollers 117 and 118, is at rest. After sufficient time has elapsed to allow heat to be stored in the upper faces of the boards 54 on the plates 21 and 22, the motor 35 for the longitudinal conveyor 20 is started. The motor 35 drives the chain 27. The cross bar 41 on the chain 27 engages the boards 54 on the plates 21 and 22 and slides them toward the glue application section B. As the boards 54 pass beneath the spreader 71 and 72, the micro switches 110, previously described, control the flow of adhesive to the upper surfaces of the boards 54. When the boards reach the end of the conveyor 20 they are discharged onto the platform 116 and moved against the end stop 126 by the rollers 117 and 118. Just as the cross bar 41 on the chain 27 of the conveyor 20 reaches the sprocket 30 and pushes the boards 54 onto the platform 116, the other cross bar 42 on the chain 27 reaches the idler sprocket 36 and trips three switches 203, 204 and 205 (see Figure 3) which are mounted on the frame 24 below the sprocket 36. The switch 203 shuts off the drive motor 35 and stops the chain 27. The switch 204 energizes the motor 53 which drives the feed table conveyor chains 48 and 49 to move a new pair of boards 54 onto the plates 21 and 22 and beneath the heater 56. These chains 48 and 49 carry the boards 54 by friction only, so the length of time this conveyor is allowed to run is not important. The switch 205 operates a valve which supplies air to air cylinder 137 and causes the sweep arms 130 and 131 to engage the boards 54 on the platform and move them onto the flipper plates 149 and 150. When the boards 54 are over the flipper plates 149 and 150 they depress a switch 206 (see Figure 12) mounted on the channel iron 151. This switch reverses the valve of the air cylinder 137 and returns the sweep arms 130 and 131. The switch 206 also operates a valve which supplies air to the air cylinder 160, causing the piston 159 thereof to move out and tilt the flipper plates 149 and 150 to drop the boards 54 into a press unit 169 of the press assembly 164. The piston 159 has a finger 207 fixed thereon which trips a switch 208 as the piston moves out to tilt the flipper plates. The switch 208, when tripped, operates a valve which supplies air to the cylinders 181 and 182, causing the horizontal pressure bar 180 to move down to straighten the boards 54 in the press unit 169. The switch 208 is connected to a time delay mechanism (not shown) which, after a predetermined time has passed, reverses the air to the cylinders 181 and 182 and raises the pressure bar.

When the horizontal pressure bar 180 moves down, the guide arms 183 and 184 at the ends thereof engage levers 209 which are pivoted at 210 to the frame members 155 on each of the end frames 156a and 156b. The levers 209 have second levers 211 fixed thereto which extend from the pivot point 210 down at each end of the press assembly 164. The downwardly moving guide arms 183 and 184 force the levers 209 down, causing the second levers 211 also to move down. When these second levers 211 are pivoted down to their full extent, that is, when the pressure bar 180 is in engagement with the boards 54, one of the levers 211 engages an arm 212 protruding outwardly from the frame 165 of the press assembly 164 directly beneath the upper press unit 169. There are six of these arms 212, one for each press unit 169. The arms 212 are attached to control valves on the pressure supply devices 178 for the press units 169 and operate to open and close the press units. When the arms 212 are pressed toward the shaft 166 the valves are operated to close the presses. When the arms 212 are moved away from the shaft 166, the press units are caused to open. As previously stated the devices 178 are mounted three at each end of the press assembly 164. The arms 212 therefore protrude three at each end, hence the necessity for a lever mechanism 209—211 at each end of the press assembly 164.

With the construction just described, the movement of the pressure bar 180 to press the warpage from the boards 54 in the press unit 169 causes the press 169 to close against the boards 54. It is essential that the press assembly 164 be restrained from possible indexing at this time, so a safety switch 213 is provided which blocks out the indexing control circuit when the pressure bar 180 is down. This switch 213 is mounted on the vertical frame piece 157 of the end frame 156a and is engaged by the guide arm 183 of the bar 180, when the bar 180 is lowered.

After the time delay during which the bar 180 is held down has elapsed, the bar 180 is raised by the cylinders 181 and 182 to its normal position. When it reaches this position, the guide arms 183 and 184 engage switches 214 and 215 mounted on the members 157 of the end frames 156a and 156b, as shown in Figures 12 and 14. The switch 214, when tripped, closes the flipper plates 149 and 150. The switch 215, when tripped, causes air to be supplied to cylinder 199 so as to move the piston 198 thereof down to index an empty press unit 169 beneath the flipper plates 149 and 150. The switch 215 is connected in a time delay circuit which, after a predetermined time, will reverse the air to the cylinder 199, and cause the arm 193 to move back to its normal position as shown in Figure 19.

When the arm 193 pivots down and is stopped by the stop 200, it depresses a switch 216 mounted on the stop 200. This switch stops the motor 53 which drives the feed table conveyor chains 48 and 49. By this time these chains 48 and 49, having been operating since the boards 54 were discharged onto the platform 116, have moved a new pair of boards 54 onto the plates 21 and 22. These new boards 54 have been adequately heated by the heater 56 and are ready to begin their journey through the machine.

When the time delay mechanism controlling the cylinder 199 reverses and returns the arm 193 to its normal position where it trips a switch 217 that energizes motor 35 for the conveyor 20, thus setting the chain 27 in motion, and starting a new cycle on the newly heated boards 54.

The hold down fingers 59, actuated by the cylinder 66, are actuated by the same switches that control the feed table conveyor chains 48 and 49, that is, the switches 204 and 216. When the chains 48 and 49 are stopped by switch 216, air is supplied to the cylinder 66 to move the fingers 59 down against the boards 54. The fingers 59 remain in this position while the boards are moved out from under them by the chain 27 and until switch 204 is tripped to start the chains 48 and 49. At this time the fingers 59 are moved up to allow new boards 54 to be moved thereunder.

As previously described, the completed laminated boards 54' are retained under pressure in the press units 169 while the glue joint cures. It has been found that if the finished board 54' is retained under pressure during four cycles of the machine, each cycle including one 60 degree rotation of the press assembly 164, adequate curing will take place. Since the time elapsed between the starting of the boards 54 toward the glue application section B and closing the press unit 169 on these boards 54 is in the neighborhood of 8 to 16 seconds, the curing time in the press unit 169 is in the neighborhood of 32 to 64 seconds. This has been found adequate.

When the press unit 169 has reached a point on the underside of the press assembly 240 degrees away from the loading point, the control arm 212 is engaged by one of two levers 218 pivoted to the press supporting frame pieces 168. The levers 218 are pivoted to the frame pieces 168 at 219 and have portions 220 thereon extending in the opposite direction and connected to springs 221. The springs 221 urge the levers 218 in a direction to move the control arms 212 outward when they are engaged. In this manner, the levers 218 open the press units 169 as the units reach the discharge point, allowing the completed boards 54' to be dropped therefrom.

It should be understood that the means just described for controlling the operation of the machine is but one of many possible control means, and described merely as illustrative. It is not intended that the invention be limited thereto.

It is believed evident from the foregoing that the machine described herein provides an efficient and automatic means for producing laminated wood products.

Having thus described the invention, we claim:

1. A machine for producing laminated boards comprising a longitudinal conveyor, means at one end of said conveyor to move pairs of boards onto said conveyor, heating means adjacent said last named means operable to store heat in the upper surfaces of said boards, means over said conveyor operable to coat the upper surfaces of the pairs of boards with adhesive as they are carried by the conveyor, means at the discharge end of the conveyor to tilt the boards on edge whereby to bring the means for tilting the boards, said means for tilting the boards operable to discharge the boards into said press means, said press means operable to hold the coated surfaces of the boards together under pressure whereby to bond the boards together.

2. In combination, a framework, a conveyor on the framework, means at one end of the conveyor operable to move pairs of boards onto the conveyor, heating means on the frame above the conveyor for heating the upper surfaces of pairs of boards on said conveyor, said conveyor operable to move pairs of boards thereon endwise from beneath said heating means, adhesive applying devices suspended from said framework over the conveyor, said devices operable to spread a coat of adhesive to the upper, heated surfaces of the pairs of boards moved thereunder on the conveyor, a board receiving platform on the framework operable to receive and support the boards as they are discharged from the conveyor, said platform including means to tilt the boards upwardly toward each other until they are on edge to bring the coated surfaces thereof together, a press mounted on the framework beneath the board tilting means operable to receive the boards after their coated surfaces have been brought together, and operable to press the boards together.

3. A machine for producing laminated boards comprising a framework, a conveyor on the framework, means at one end of the conveyor to move pairs of boards thereon, heating means mounted on the framework above the conveyor to heat the upper surfaces of the boards, said conveyor operable to move the boards endwise to the discharge end thereof, means on the framework above the conveyor to coat the upper surfaces of the pair of boards as they are moved endwise, an assembly platform on the framework at the discharge end of the conveyor positioned to receive the boards from the conveyor, said platform including a pair of elongated plates positioned side by side and pivoted to the framework for tilting to move their adjacent edges downward, means on the platform to position the boards on said plates, means for tilting said plates whereby to turn the boards on edge with their glued faces together and allow them to fall between the tilted plates, a press mounted on the frame below the elongated plates, the press having opposed jaws aligned beneath the elongated plates to receive the boards therebetween, and means to close the jaws on the boards whereby to press the coated surfaces together.

4. A machine for producing laminated boards comprising a framework, a conveyor on the framework means at one end of the conveyor to move pairs of boards thereon, heating means mounted on the framework above the conveyor to heat the upper surfaces of the boards, said conveyor operable to move the boards endwise to the discharge end thereof, adhesive spreading devices suspended on the framework above the conveyor for movement up and down with respect to the conveyor, said spreading devices each having a spreader shoe on the bottom thereof operable to engage the upper surface of a board moved thereunder and operable to apply an adhesive coating to said surface, means to supply adhesive to said spreaders, valve means on said spreaders operable to permit flow of adhesive thereto, valve control means connected to said valve means operable to prevent flow of adhesive when the shoes are not engaged with a board, a press mounted in the framework at the discharge end of the conveyor, means above the press receiving the boards from said conveyor, said last named means including a mechanism for folding the heated and coated surfaces of the boards together into engagement with each other and means operable to force the folded together boards edgewise into the press.

5. In combination, a framework including a board support on the framework to move pairs of boards onto said support, means on the framework above the support to heat the upper surfaces of pairs of boards on the support, means on the framework to move the boards endwise on the support, adhesive spreading devices suspended from the framework above the support, said adhesive spreading devices operable to engage the upper heated surfaces of said boards and apply a coating of adhesive thereto as the boards are moved endwise, board tilting means on the framework receiving said boards after they have been coated with adhesive, said tilting means operable to tilt the boards on edge with their coated surfaces adjacent each other, a press assembly mounted on the framework beneath said tilting means, said press assembly including a plurality of separate press units, means to move said press assembly whereby to bring said press units beneath the tilting means in succession, and means to force the tilted boards edgewise into one of the press units.

6. In combination, a framework including a board support, means above the support to heat the upper surfaces of pairs of boards on the support, means to move the boards endwise on the support, adhesive applying devices suspended from the framework above the support, said adhesive applying devices operable to engage the upper surfaces of boards moved thereunder and operable to apply a coating of adhesive to said surfaces, an assembly platform on the framework receiving the boards after they have been coated, said platform including a pair of elongated plates pivoted to the framework for rotation out of the plane of the platform in directions to move their adjacent edges downward, means on the platform to position the boards on said plate, means to tilt the plates whereby to turn the boards on edge with their coated surfaces together, a press assembly mounted on the framework below the elongated plates, said press assembly mounted for rotation and having a plurality of separate press units thereon, means to rotate the press assembly whereby to move the press units beneath the elongated plate in succession, and means to force the boards edgewise into one of the press units after they have been tilted to bring their coated surfaces together.

7. A device for producing laminated products comprising a framework, a longitudinal conveyor on said framework, a transverse conveyor at one end of the longitudinal conveyor, a plurality of boards positioned on said transverse conveyor in side by side relation, said transverse conveyor operable to move said boards sidewise onto the longitudinal conveyor, in pairs, a heater mounted on the framework over the longitudinal conveyor at the end thereof adjacent the transverse conveyor for heating the upper surfaces of said boards, said longitudinal conveyor operable to move the pairs of boards endwise, adhesive applying devices suspended from the framework above the longitudinal conveyor and operable to engage the pairs of boards as they are moved thereunder and apply a coating of adhesive to the upper heated surfaces thereof, a press, board tilting means above the press receiving the pairs of boards after they have been coated with adhesive, said last named means operable to tilt the boards of each pair and bring the upper coated surfaces thereof toward each other to put their coated surfaces together, and means to force said tilted boards edgewise into the press.

8. In a device for laminating boards into a single structure, having a framework including a board support, means above the support to heat the upper surfaces of boards on the support, means to move the board endwise from the heating means in pairs, means operable to tilt the pairs of boards on edge to bring their heated surfaces together, and means for pressing the boards together, means for applying a coating of adhesive to the upper heated surfaces of said boards as they move endwise from said heating means toward said tilting means, said means for applying a coating of adhesive comprising adhesive applying devices, having spreading shoes on the bottom sides thereof, said devices each being suspended above the board support for vertical movement with respect to the board support, and for transverse tilting with respect to the board support.

9. In a device for laminating boards into a single structure, having a framework including a board support, means above the support to heat the upper surfaces of boards on the support, means to move the boards endwise from the heating means, means for tilting the boards edgewise with their heated surfaces together, and means for pressing the boards together, means for applying a coating of adhesive to the upper heated surfaces of said boards as they move endwise from said heating means toward said tilting means, said means for applying a coating of adhesive comprising adhesive applying devices having spreading shoes on the bottom thereof operable to engage the upper surfaces of boards passed thereunder, pairs of longitudinally spaced links pivoted to the framework above the board support, said adhesive applying devices being pivoted between said pairs of links for transverse tilting therebetween, said links supporting the adhesive applying devices for vertical and longitudinal movement with respect to the board support whereby to cause said devices to ride upon the upper surfaces of boards passed thereunder on the board support, and adhesive supply means for said devices, said supply means including valves operable to control the flow of adhesive from the spreading shoes.

10. In a device for laminating boards into a single structure, having a framework including a board support, means above the support to heat the upper surfaces of boards on the support, means to move the boards endwise on the support and means for applying a coating of adhesive to the upper surfaces of said boards, means for assembling said boards to form a single structure comprising a platform receiving said boards after they have been coated, transverse roller means on said platform, stop means at the end of the platform, said roller means operable to move the boards endwise on the platform and hold them against the stop means, a pair of elongated plates pivoted to the framework at each end and positioned against the platform, said plates being pivotable out of the plane of the platform in directions to move their adjacent edges downward, sweep arms mounted at the edge of the platform operable to move the boards sidewise onto the elongated plates, a press mounted on the framework below the elongated plates, means to tilt the elongated plates whereby to tilt the boards thereon edgewise with their coated surfaces together, and a horizontal pressure bar mounted above said elongated plates for vertical movement, said pressure bar operable to move down to engage the upper edge of said tilted boards and press them edgewise into the press, the press operable to press the coated surfaces of the boards together.

11. Apparatus for producing laminated wood products comprising means for advancing along a path two boards in side by side relation with the surfaces to be joined separated, heating means adjacent said path operable to store heat in the surfaces of said boards to be joined, glue applying means positioned adjacent said path operable to apply glue to the heated surface of at least one of said boards as it is advanced along said path, means adjacent said path operable to bring the heated surfaces of said boards together, a press, and edge engaging means extending throughout the length of the edges of the boards adjacent the juxtaposed coated surfaces and operable to engage the boards and force said boards into the press, said last named means holding the boards in edge alignment until the boards are secured under pressure by the press.

References Cited in the file of this patent

UNITED STATES PATENTS

| | | |
|---|---|---|
| 1,851,709 | Laucks | Mar. 29, 1932 |
| 1,999,509 | Merritt | Apr. 30, 1935 |
| 2,318,695 | Klammt | May 11, 1943 |
| 2,344,488 | Bowling | Mar. 21, 1944 |
| 2,490,819 | Lambert | Dec. 13, 1949 |
| 2,729,584 | Foster | Jan. 3, 1956 |